United States Patent [19]

Stolfo

[11] 4,173,684
[45] Nov. 6, 1979

[54] PRODUCTION OF NOVEL METAL MODIFIED NOVOLAK RESINS AND THEIR USE IN PRESSURE SENSITIVE PAPERS

[75] Inventor: John J. Stolfo, Chillicothe, Ohio

[73] Assignee: The Mead Corporation, Dayton, Ohio

[21] Appl. No.: 830,993

[22] Filed: Sep. 6, 1977

[51] Int. Cl.$^2$ .................. B32B 27/10; C08G 8/04
[52] U.S. Cl. .................. 428/531; 106/21; 282/27.5; 427/145; 427/150; 427/146; 427/400; 428/420; 428/913; 428/537; 428/914; 528/148; 528/155
[58] Field of Search .............. 427/145, 150, 146, 400; 282/27.5; 106/21; 428/420, 913, 531, 914, 537; 260/53 R; 528/148, 155

[56] References Cited

U.S. PATENT DOCUMENTS

| | | | |
|---|---|---|---|
| 2,716,099 | 8/1955 | Bradley et al. | 260/53 R |
| 3,624,038 | 11/1971 | Weidner | 260/53 R |
| 3,674,723 | 7/1972 | Vredenburgh et al. | 260/53 R |
| 3,732,120 | 5/1973 | Brockett et al. | 428/531 |
| 3,737,410 | 6/1973 | Mueller | 260/59 |
| 3,874,895 | 4/1975 | Hayashi et al. | 427/145 |
| 4,025,490 | 5/1977 | Weaver | 427/145 |
| 4,034,128 | 7/1977 | Kelley | 427/150 |

FOREIGN PATENT DOCUMENTS 772544 11/1967 Canada .................. 427/150

Primary Examiner—John T. Goolkasian
Assistant Examiner—J. J. Gallagher
Attorney, Agent, or Firm—Charles N. Shane, Jr.; Stephen H. Cagle; Wilson G. Palmer

[57] ABSTRACT

A novel metal modified novolak resin is prepared. The metal modified novolak resin is an electron acceptor and is further characterized by its compatability with the surface properties of a paper substrate. The metal modified novolak resin comprises a reaction product of a novolak resin and a metal salt. The novolak resin is a reaction product of a mixture containing a para-substituted phenol selected from the group consisting of paraalkylphenols having alkyl groups of about 1 to about 12 carbon atoms, paraphenylphenol and mixtures thereof, salicylic acid and formaldehyde.

The novel metal modified novolak resin is prepared by heating a mixture containing one or more para-substituted phenols, salicylic acid, formaldehyde and an acid catalyst for a period of time sufficient to substantially completely react the phenols, salicylic acid and formaldehyde to form a melted novolak resin. The melted novolak resin is mixed with a zinc salt in a inert atmosphere to form the metal modified novolak resin.

The metal modified novolak resin prepared as above can be coated on a paper substrate to produce a pressure-sensitive paper.

20 Claims, No Drawings

PRODUCTION OF NOVEL METAL MODIFIED NOVOLAK RESINS AND THEIR USE IN PRESSURE SENSITIVE PAPERS

BACKGROUND OF THE INVENTION

1. Field of the Invention

This invention relates to the production of novel metal modified novolak resins containing salicylic acid. These metal modified novolak resins can be coated on a paper substrate to produce a pressure-sensitive paper having improved print character and stability of print on ageing.

2. Prior Art

Pressure-sensitive carbonless copy paper, briefly stated, is a standard type of paper wherein during manufacture the backside of a paper substrate is coated with what is referred to as CB coating, the CB coating containing one or more color precursors generally in capsular, and more preferably microcapsular, form. At the same time, the front side of the paper substrate is coated during manufacture with what is referred to as a CF coating which contains one or more color developers. Both the color precursor and the color developer remain in the coating compositions on the respective back and front surfaces of the paper in colorless form. This is true until the CB and CF coatings are brought into abutting relationship and sufficient pressure, as by a typewriter, is applied to rupture the CB coating to release the color precursor. At this time the color precursor transfers to the CF coating and reacts with the color developer therein to form an image. Patents relating to carbonless paper products are:

U.S. Pat. No. 2,712,507 (1955) to Green.
U.S. Pat. No. 2,730,456 (1956) to Green et al.
U.S. Pat. No. 3,455,721 (1969) to Phillips et al.
U.S. Pat. No. 3,466,184 (1969) to Bowler et al.
U.S. Pat. No. 3,672,935 (1972) to Miller et al.

Another pressure-sensitive product which is in an advanced stage of development and commercialization at this time and which is available in some business sectors is referred to as self-contained paper. Very generally stated, self-contained paper refers to an imaging system wherein only one side of the paper needs to be coated and the one coating contains both the color precursor, generally in encapsulated form, and the color developer. Thus, when pressure is applied, again as by a typewriter or other writing instrument, the color precursor capsule is ruptured and reacts with the surrounding color developer to form an image. Both the carbonless paper image transfer system and the self-contained system have been the subject of a great deal of patent activity. A typical autogenous record material system, earlier sometimes referred to as "self-contained" because all elements for making a mark are in a single sheet, is disclosed in U.S. Pat. No. 2,730,457 (1956) to Green.

U.S. Pat. Nos. 3,455,721, 3,466,184 and 3,672,935, all mentioned above, disclose the use of phenol-aldehyde (novolak) resins as color developers (electron acceptors) in the production of pressure-sensitive CF record sheets. These novolak resins can be applied to paper either as a dispersion of ground resin or a solution of resin in an organic solvent to form the record sheet. Such record sheets can be used in conjunction with transfer sheets containing colorless color precursors of the electron donor type such as Crystal Violet Lactone.

The use of metal compounds as a means of improving the color-forming reactions of novolak resins with electron donor color precursors is known. Acidic water soluble metal salts incorporated in aqueous coatings of ground novolak resins are disclosed in U.S. Pat. No. 3,516,845 (1970) to Brockett while U.S. Pat. No. 3,723,156 (1973) to Brockett et al. discloses a further improvement through a similar use of oil soluble metal salts. U.S. Pat. Nos. 3,732,120 (1973) to Brockett et al. and 3,737,410 (1973) to Mueller disclose the interaction of a metal compound such as zinc hydroxy benzoate, zinc acetylacetonate and zinc dibenzoate with a para-substituted novolak resin by melting the resin and metal compound together to give a color developer which shows increased color intensity and resistance to fading. U.S. Pat. No. 4,025,490 (1977) to Weaver discloses metal-modified para-substituted novolak resins prepared by melting together a novolak resin and a metal salt of an alkanoic acid in the presence of an ammonium compound. These resins result in significant improvements, when used in a manifolding system, in rate of color image development, stability of image on ageing (fade resistance) and storage stability prior to imaging (decline).

U.S. Pat. No. 3,952,132 (1976) to Kato et al. discloses the preparation of a reacted compound between an alkali metal salt of a phenol resin, including novolaks, and a water soluble metallic compound. Recording sheets containing this reacted compound have improved developing ability and resistance to light irradiation. U.S. Pat. No. 3,772,052 (1973) to Kimura et al. discloses preparation of a color developer metal compound of a polymer which is the reaction product of an aromatic carboxylic acid containing at least one hydroxyl group, such as salicylic acid, with an aldehyde or acetylene. The metal compound of the polymer improved color developing ability and light resistance over the carboxylic acid or the metal compound.

U.S. Pat. Nos. 3,874,895 (1975) to Hayashi et al. and 3,924,027 (1975) to Saito et al. disclose the preparation of color developers which are physical mixtures of: (1) an organic polymer, such as phenol-formaldehyde condensates or substituted phenol-formaldehyde condensates, and (2) a carboxylic acid which may be salicylic acid or a metal salt thereof. Improved resistance to heat, light and ageing and improved color developing ability are among the advantages of these color developers.

Most of the above color developers which contain an aromatic carboxylic acid, such as salicylic and, or metal salts thereof have the disadvantage of being insoluble or only slightly soluble in organic solvents. Thus, these color developers are not adaptable to application in solvent solutions to a paper substrate in the manner disclosed in U.S. Pat. No. 3,466,184.

I have found that novel color developers containing salicylic acid in reacted form with para-substituted phenols and formaldehyde can be prepared which are soluble in most organic solvents and can be applied to paper in solvent solution to give a pressure-sensitive record sheet of qualities superior to those found in the prior art. These novel metal modified novolak resins can be prepared by reacting, in the presence of acid catalyst, a mixture of a para-substituted phenol, salicylic acid and formaldehyde and melting the reacted mixture with a metal containing salt. The above process has been used for preparing novolak resins formed by the reaction of a para-substituted phenol and formaldehyde, but have not been used for the novolak resins of the instant invention in which a part of the para-substituted phenol has been replaced by salicylic acid.

Record sheets prepared using the novel metal modified novolak resins of this invention have shown improved intensity and rate of color image development and improved stability of the image on ageing (fade resistance) and storage stability prior to imaging (decline) over record sheets prepared from the prior art metal modified novolak resins.

STATEMENT OF THE INVENTION

In one aspect of this invention, a novel metal modified novolak resin is prepared. The metal modified novolak resin is an electron acceptor and is further characterized by its compatability with the surface properties of a paper substrate. The metal modified novolak resin comprises a reaction product of a novolak resin and a metal salt. The novolak resin is a reaction product of a mixture containing a para-substituted phenol selected from the group consisting of para-alkyl-phenols having alkyl groups of about 1 to about 12 carbon atoms, para-phenylphenol and mixtures thereof, salicylic acid and formaldehyde.

In another aspect of this invention, the novel metal modified novolak resin is prepared by heating a mixture containing one or more para-substituted phenols, salicylic acid, formaldehyde and an acid catalyst for a period of time sufficient to substantially completely react the phenols, salicylic acid and formaldehyde to form a melted novolak resin. The melted novolak resin is mixed with a zinc salt in an inert atmosphere to form the metal modified novolak resin.

In still another aspect of this invention, the metal modified novolak resin prepared as above can be coated on a paper substrate to produce a pressure-sensitive paper.

DETAILED DESCRIPTION OF THE INVENTION

This invention involves the production of novel metal modified resins from a combination of one or more para-substituted phenols and salicylic acid by condensation in the presence of an acid catalyst with formaldehyde. The novel novolak resins are then metal modified by melting with a metal salt. The resultant metal modified novolak resin is preferably used as a color developer in the preparation of pressure-sensitive papers, particularly in the preparation of record sheets where the color developers are applied to a paper substrate as an organic solution of the developer and thereafter dried by evaporating the solvent. Such a method of applying the color developers to a paper substrate is described in U.S. Pat. No. 3,649,357 (1972) to Davis et al.

The para-substituted phenols useful in the practice of this invention are the para-alkyl phenols having 1 to 12 carbon atoms, para-phenylphenol and mixtures thereof. Examples of these para-alkyl phenols are: para-ethylphenol, para-propylphenol, para-butylphenol, para-amylphenol, para-hexylphenol, para-heptylphenol, para-octylphenol, para-nonylphenol, para-decylphenol. The preferred phenols are para-tert-butylphenol, para-tert-octylphenol, para-nonylphenol, para-phenylphenol and a mixture of para-tert-butylphenol and para-tert-octylphenol. The formaldehyde is preferably a 37% aqueous solution of same.

The mole ratio of salicylic acid to para-substituted phenol useful in this invention is from about 0.06 to 1 to about 0.5 to 1 and the preferred mole ratio is from about 0.15 to 1 to about 0.45 to 1. The mole ratio of formaldehyde to the combined para-substituted phenol and salicylic acid useful in this reaction is from about 0.5 to 1 to about 1 to 1. The preferred ratio is about 0.65 to 1 to about 0.95 to 1 and most preferred ratio is from about 0.70 to 1 to about 0.85 to 1.

The specific acid catalysts useful in this invention are not critical. Acids commonly used for catalyzing condensation reactions to produce novolak resins, such as acetic, hydrochloric, sulfuric, phosphoric, oxalic and para-toluenesulfonic acids, may be used. The preferred acid catalyst is para-toluenesulfonic acid. The acid catalyst is present in the reaction mixture in amounts conventionally used in the production of acid novolak resins.

The metals suitable for use as metal salts in this invention are copper, zinc, cadmium, aluminum, indium, tin, chromium, cobalt and nickel. The preferred metal is zinc. The salts suitable for use are the metal alkanoates having 1 to 3 carbon atoms; namely, the metal formates, acetates and propionates, and the metal hydroxybenzoates, dibenzoates and acetylacetonates. The preferred salts are the zinc salts of the alkanoates having 1 to 3 carbon atoms, and, more preferably, zinc dipropionate.

The metal salts are present in the mixture in an amount sufficient to yield novolak resins having about 0.5% to about 15% by weight of the metal based on the combined weight of phenol and salicylic acid. Preferably, the metal content is about 1.5% to 5.0% by weight on the same basis.

The process of this invention involves the acid condensation of p-substituted phenols plus salicylic acid with formaldehyde to prepare the novolak resin. The novolak resin thus prepared is reacted in melted form with a metal salt.

In a preferred form of the process, the para-substituted phenol and salicylic acid are melted together in a reaction vessel, the formaldehyde and acid catalyst are then added and the resultant mixture is refluxed for a period of time necessary for substantially complete reaction of the above ingredients. This may be a period of one to several hours depending on the ingredients and relative concentrations each ingredient including catalyst and the temperature and pH of the reacting mixture. The pH of the reacting mixture is preferably below 4. The water present in the mixture is removed by vacuum distillation. Although this method has been known to be used for the production of para-alkylphenol novolak resins prior to this invention, the process has not heretofore been used for the production of para-alkylphenol-salicylic acid novolak resins. It has been repeatedly demonstrated that the use of salicylic acid in the manufacture of metal modified novolak resins results in superior performance as shown hereinafter in Table I. The successful use and incorporation of salicylic acid in the novolak resins is unexpected from a chemical standpoint and results in substantial performance improvement.

The novolak resins produced by the above described method are preferably zinc modified by melting together in an inert atmosphere, such as a helium blanket, the novolak resin, zinc dipropionate and ammonium carbonate and heating to 160°-170° C. for a period of about an hour. Details of such a method are disclosed in U.S. Pat. No. 4,025,490 described supra, the subject matter of which is incorporated herein by reference.

The metal modified novolak resins prepared by the process of this invention are electron acceptors when used in conjunction with color precursors such as Crystal Violet Lactone, and therefore, are suitable for use in pressure-sensitive copy systems. These novolak resins are thermoplastic and are soluble in most color precursor carrier liquids and in the ordinary fast drying organic solvents such as acetone, methylethylketone, butyl acetate, toluene and xylene. Thus, they may be readily adapted to application to a surface of a paper substrate particularly by printing or coating in hot melt or organic solution form. These metal modified novolak resins are compatible with the surface properties of the paper substrate. The polymeric distribution is largely dimeric and trimeric with some monomers and higher oligimers being present.

The following examples illustrate the preferred embodiments and are not intended to limit the scope of the invention. The examples are as follows:

EXAMPLE 1

A reaction kettle was charged with 309 parts (1.5 moles) of para-tert-octylphenol, 225 parts (1.5 moles) of para-tert-butylphenol and 138 parts (1.0 moles) of salicylic acid. The dry powders were heated. 67.2 parts (ten percent by weight on phenol plus salicylic acid) of oxalic acid and 239 parts of commercially available 37% aqueous solution of formaldehyde containing 3 moles of formaldehyde were added to the partially melted mixture. The mixture was refluxed for four hours. The water was stripped under aspirator vacuum. The mixture was blanketed with helium gas and heated to 190° C. for one hour. The mixture was cooled to 130° C. 89.3 parts (3.8% zinc on phenol plus salicylic acid) of zinc dipropionate and 83.2 parts (4.0% ammonia on phenol plus salicylic acid) of ammonium carbonate were added to the stirring material. The temperature was raised to 165° C. and held for one hour. A helium blanket was maintained over the molten mixture during zinc modification to prevent the darkening which occurs when the hot molten resin comes in contact with oxygen in the air. A resinous material was produced.

The resinous material was dissolved in toluene to provide a solution containing 25% resin solids. The solution was applied to the surface of a bond paper by gravure coating to give a weight of dried resin of about 0.5 pound per $25 \times 38$-500(3300 ft$^2$) ream of paper.

The solvent coated paper was tested as a record sheet by placing the coated surface thereof in contact with the coated side of a paper coated with microcapsules containing an oil solution of Crystal Violet Lactone. This sheet couple was imaged with an electric typewriter using the character m in a repeating block pattern, and the initial intensity of the image was measured as the ratio of the reflectance of the imaged area to the reflectance of the unimaged background, after an elapsed time of twenty minutes. Thus, the more intense or darker images show as lower values, and higher values indicate weak or faint images. This test is called Typewriter Intensity (T.I.) and may be expressed mathematically as: $T.I. = (100) R_i/R_o$ where $R_i$ is reflectance of the imaged area and $R_o$ is reflectance of the background (unimaged) area as measured with a Bausch and Lomb Opacimeter. Two values are reported for typewriter intensity one based on a 2-part assembly and one on a 4-part assembly.

Print speed was measured by imaging by one pass through a pair of calender rolls, with image intensity measured after 30 seconds development time. The lower the value reported, the faster the print speed.

Storage stability (decline) of the coated papers was determined by a three-hour exposure of the coated side of the paper to ultraviolet light in a Fadeometer followed by imaging and determination of typewriter intensity.

Fade resistance (fade) was measured by loss of image intensity upon 3 hours exposure of an imaged area to ultraviolet light, again using a Fadeometer.

Storage stability in the presence of residual solvent (solvent decline) of the coated papers was determined by one hour exposure of the samples to a toluene saturated atmosphere at room temperature (20° C.) followed by imaging and determination of typewriter intensity.

The results of the tests are given in Table I.

EXAMPLE 2

The process of Example 1 was repeated using 412 parts (2 moles) of para-tert-octylphenol, 100 parts (0.67 moles) of para-tert-butylphenol, 92 parts (0.67 moles) of salicylic acid and 214 parts of 37% aqueous formaldehyde (2.6 moles of formaldehyde). A resinous material was produced. The resinous material was coated on a bond paper and tested as in Example 1. The results of the tests are given in Table I.

Comparative Example A

The process of Example 1 and 2 was repeated using 412 parts (2 moles) of para-tert-octylphenol and 300 parts (2 moles) of para-tert-butylphenol. No salicylic acid was used in this example. A resinous material was produced. The resinous material was coated on bond paper and tested as in Examples 1 and 2. The results of the tests are given in Table I.

EXAMPLE 3

The process of Example 1 was repeated using 412 parts (2 moles) of para-tert-octylphenol, 92 parts (0.67 moles) of salicylic acid and 193 parts of 37% aqueous formaldehyde (2.38 moles of formaldehyde). A resinous material was produced. The resinous material was coated on a bond paper and tested as in Example 1. The results of the tests are given in Table I.

Comparative Example B

A commercially available zinc modified para-octylphenol novolak resin was prepared using a para-toluenesulfonic acid catalyst. The novolak resin was zinc modified under a nitrogen blanket. The zinc modified novolak resin was coated on bond paper and tested as in Example 1. The results of the tests are given in Table I as follows:

TABLE I

| Example No. | Initial T.I. 2-Part | Initial T.I. 4-Part | Print Speed | (2-Part Form) Fade | (2-Part Form) Decline | (2-Part Form) Solvent Decline Initial | (2-Part Form) Solvent Decline Decline |
|---|---|---|---|---|---|---|---|
| Comparative Example A | 66 | 64 | 71 | 79 | 69 | 70 | 77 |

TABLE I-continued

| Example No. | Initial T.I. 2-Part | Initial T.I. 4-Part | Print Speed | (2-Part Form) Fade | (2-Part Form) Decline | (2-Part Form) Solvent Decline Initial | (2-Part Form) Solvent Decline Decline |
|---|---|---|---|---|---|---|---|
| 1 | 61 | 56 | 64 | 66 | 64 | 60 | 60 |
| 2 | 61 | 59 | 60 | 67 | 65 | 64 | 65 |
| Comparative Example B | 68 | 64 | 73 | 73 | 66 | 65 | 79 |
| 3 | 60 | 53 | 61 | 68 | 64 | 61 | 68 |

The lower values in the above table indicate more intense images. The novolak resins of Comparative Examples A and B do not contain any salicylic acid. Examples 1, 2 and 3 contained salicylic acid and are embodiments of the instant invention. Comparative Examples A and Examples 1 and 2 should be compared since they all involve a metal modified para-tert-butylphenol/para-tert-octylphenol resin. Comparative Example B and Example 3 should be compared since they involve a metal modified para-tert-octylphenol resin. An examination of the data shows that metal modified novolak resins containing salicylic acid show significant improvements in Initial T.I., print speed, fade, decline and solvent decline over the prior art metal modified novolak resins containing no salicylic acid.

What is claimed is:

1. A metal modified novolak resin, said metal modified novolak resin being an electron acceptor suitable for use in a pressure-sensitive copy system and being co-reactive with color precursors of the electron donor type, said metal modified novolak resin being further characterized by compatability with the surface properties of a paper substrate, said metal modified novolak resin comprising a reaction product of a novolak resin and a metal alkanoate salt of an alkanoic acid having 1 to 3 carbon atoms, the metal being selected from the group consisting of copper, zinc, cadmium, aluminum, indium, tin, chromium, cobalt and nickel, said novolak resin being a reaction product in the presence of an acid catalyst of a mixture consisting essentially of:
   (a) a para-substituted phenol selected from the group consisting of para-alkylphenols having an alkyl group of from about 1 to about 12 carbon atoms, para-phenylphenol and mixtures thereof;
   (b) salicylic acid; and
   (c) formaldehyde.

2. The metal modified novolak resin of claim 1 wherein said metal salt is taken from the group consisting of copper, zinc, cadmium, aluminum, indium, tin, chromium, cobalt and nickel salts.

3. The metal modified novolak resin of claim 1 wherein said metal salt is a zinc salt of an alkanoic acid having from one to three carbon atoms.

4. The metal modified resin of claim 1 wherein said para-substituted phenol is para-tert-butylphenol.

5. The metal modified resin of claim 1 wherein said para-substituted phenol is para-tert-octylphenol.

6. The metal modified resin of claim 1 wherein said para-substituted phenol is para-nonylphenol.

7. The metal modified resin of claim 1 wherein said para-substituted phenol is a mixture of para-tert-octylphenol and para-tert-butylphenol.

8. The metal modified resin of claim 1 wherein said salicylic acid and said para-substituted phenol are present in said mixture in a mole ratio of said acid to said phenol of about 0.06 to 1 to about 0.5 to 1 and said formaldehyde and said salicylic acid plus said para-substituted phenol are present in said mixture in a mole ratio of said formaldehyde to said acid and said phenol of about 0.5 to 1 to about 1 to 1.

9. The metal modified novolak resin of claim 1 wherein from about 0.5% to about 15% of metal by weight based on the total weight of phenol plus salicylic acid is present in said novolak resin.

10. A metal modified novolak resin said metal modified novolak resin being an electron acceptor suitable for use in a pressure-sensitive copy system and being co-reactive with color precursors of the electron donor type, said metal modified novolak resin being further characterized by compatability with the surface properties of a paper substrate, said metal modified novolak resin comprising a reaction product of a zinc salt of an alkanoic acid having 1 to 3 carbon atoms and a novolak resin, said novolak resin being a reaction product in the presence of an acid catalyst of a mixture consisting essentially of:
   (a) a para-substituted phenol, said para-substituted phenol being selected from the group consisting of para-alkyl phenols having an alkyl group of 1 to 12 carbon atoms and mixtures thereof;
   (b) salicylic acid; and
   (c) formaldehyde;
wherein said salicylic acid and said para-substituted phenol are present in said mixture in a mole ratio of said acid to said phenol of about 0.06 to 1 to about 0.5 to 1 and said formaldehyde and said salicylic acid plus said para-substituted phenol are present in said mixture in a mole ratio of said formaldehyde to said acid and said phenol of about 0.5 to 1 to about 1 to 1.

11. A pressure-sensitive paper comprising a paper substrate containing on one surface thereof a coating containing a metal modified novolak resin which is co-reactive with color precursors of the electron donor type comprising a reaction product of a novolak resin and a metal alkanoate salt of an alkanoic acid having 1 to 3 carbon atoms, the metal being selected from the group consisting of copper, zinc, cadmium, aluminum, indium, tin, chromium, cobalt and nickel, said novolak resin being a reaction-product in the presence of an acid catalyst of a mixture consisting essentially of:
   (a) a para-substituted phenol selected from the group consisting of para-alkyl phenols having an alkyl group of 1 to about 12 carbon atoms, para-phenylphenol and mixtures thereof,
   (b) salicylic acid, and
   (c) formaldehyde,
said metal modified novolak resin being compatible with the surface characteristics of said paper substrate.

12. The pressure-sensitive paper of claim 11 wherein said metal salt is taken from the group consisting of copper, zinc, cadmium, aluminum, indium, tin, chromium, cobalt and nickel salts.

13. The pressure-sensitive paper of claim 11 wherein said metal salt is a zinc salt of an alkanoic acid having from one to three carbon atoms.

14. The pressure-sensitive paper of claim 11 wherein said para-substituted phenol is para-tert-butylphenol.

15. The pressure-sensitive paper of claim 11 wherein said para-substituted phenol is para-tert-octylphenol.

16. The pressure-sensitive paper of claim 11 wherein said para-substituted phenol is para-nonylphenol.

17. The pressure-sensitive paper of claim 11 wherein said para-substituted phenol is a mixture of para-tert-octylphenol and para-tert-butylphenol.

18. The pressure-sensitive paper of claim 11 wherein said salicylic acid and said para-substituted phenol are present in said mixture in a mole ratio of said acid to said phenol to about 0.06 to 1 to about 0.5 to 1 and said formaldehyde and said salicylic acid plus said para-substituted phenol are present in said mixture in a mole ratio of said formaldehyde to said acid and said phenol of about 0.5 to 1 to about 1 to 1.

19. The pressure-sensitive paper of claim 11 wherein from about 0.5% to about 15% of metal by weight based on the total weight of phenol plus salicylic acid is present in said novolak resin.

20. A pressure-sensitive paper comprosing a paper substrate containing on one surface thereof a metal modified novolak resin, said metal modified novolak resin being an electron acceptor suitable for use in a pressure-sensitive copy system which is co-reactive with color precursors of the electron donor type, said metal modified novolak resin being further characterized by compatibility with the surface properties of a paper substrate, said metal modified novolak resin comprising a reaction product of a zinc salt of an alkanoic acid having 1 to 3 carbon atoms and a novolak resin, said novolak resin being a reaction product in the presence of an acid catalyst of a mixture consisting essentially of:

(a) a para-substituted phenol, said para-substituted phenol being selected from the group consisting of para-alkyl phenols having an alkyl group of 1 to 12 carbon atoms and mixtures thereof;

(b) salicylic acid; and (c) formaldehyde;

wherein said salicylic acid and said para-substituted phenol are present in said mixture in a mole ratio of said acid to said phenol of about 0.06 to 1 to about 0.5 to 1 and said formaldehyde and said salicylic acid plus said para-substituted phenol are present in said mixture in a mole ratio of said formaldehyde to said acid and said phenol of about 0.5 to 1 to about 1 to 1.

* * * * *